(12) United States Patent
Chandrasekhar et al.

(10) Patent No.: US 10,146,552 B2
(45) Date of Patent: *Dec. 4, 2018

(54) IDENTIFICATION OF BOOTABLE DEVICES

(71) Applicant: International Business Machines Corporation, Armonk, NY (US)

(72) Inventors: Sudhir Chandrasekhar, Bangalore (IN); Syed A. Rehman, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,133

(22) Filed: Jun. 22, 2016

(65) Prior Publication Data

US 2017/0371679 A1 Dec. 28, 2017

(51) Int. Cl.
  *G06F 9/00* (2006.01)
  *G06F 9/24* (2006.01)
  *G06F 15/177* (2006.01)
  *G06F 9/4401* (2018.01)
  *G06F 3/06* (2006.01)

(52) U.S. Cl.
  CPC .......... *G06F 9/4406* (2013.01); *G06F 3/0604* (2013.01); *G06F 3/067* (2013.01); *G06F 3/0653* (2013.01); *G06F 9/441* (2013.01); *G06F 9/4416* (2013.01)

(58) Field of Classification Search
  CPC .................................................... G06F 9/4406
  See application file for complete search history.

(56) References Cited

U.S. PATENT DOCUMENTS

| 6,272,628 B1 * | 8/2001 | Aguilar ................. G06F 9/4401 |
| | | 713/2 |
| 6,450,832 B1 * | 9/2002 | Aguilar ................ H01R 4/2425 |
| | | 439/490 |
| 6,560,706 B1 * | 5/2003 | Carbajal ............... G06F 9/4416 |
| | | 713/155 |
| 6,748,525 B1 | 6/2004 | Hubacher et al. |
| 6,754,818 B1 | 6/2004 | Lee et al. |
| 7,073,053 B1 | 7/2006 | Oz et al. |
| 7,093,120 B2 | 8/2006 | Keohane et al. |

(Continued)

OTHER PUBLICATIONS

Chandrasekhar, et al., "Improved Identification of Bootable Evices", U.S. Appl. No. 15/663,768, filed Jul. 30, 2017.

(Continued)

*Primary Examiner* — Mohammed Rehman
(74) *Attorney, Agent, or Firm* — Daniel R. Simek

(57) ABSTRACT

A method for managing an initiation of a computing system. In an embodiment, the method includes a computer processor detecting that a first computing system receives a request to initiate a second computing system. The method further includes accessing a table that includes information associated with a plurality of storage entities that include bootable OS images, where the plurality of storage entities are included in at least one storage system. The method further includes determining a first storage entity that includes a corresponding instance of a first bootable OS image of the requested second computing system. The method further includes initiating the requested second computing system based, at least in part, on the instance of the bootable OS image of the first storage entity.

16 Claims, 4 Drawing Sheets

(56) References Cited

U.S. PATENT DOCUMENTS

| | | | |
|---|---|---|---|
| 7,886,140 B2 | 2/2011 | Jiang | |
| 7,962,737 B2* | 6/2011 | Lo | G06F 9/4416 |
| | | | 713/1 |
| 7,971,045 B1 | 6/2011 | Currid et al. | |
| 8,504,815 B2 | 8/2013 | Joshi et al. | |
| 8,555,048 B2 | 10/2013 | Goldstein et al. | |
| 9,021,315 B1* | 4/2015 | Deb | G06F 11/0712 |
| | | | 714/4.1 |
| 2004/0193867 A1 | 9/2004 | Zimmer et al. | |
| 2006/0143432 A1* | 6/2006 | Rothman | G06F 9/4416 |
| | | | 713/2 |
| 2008/0082809 A1* | 4/2008 | Rothman | G06F 9/4416 |
| | | | 713/1 |
| 2008/0155243 A1 | 6/2008 | Diep et al. | |
| 2008/0256221 A1* | 10/2008 | Sharma | G06F 9/4416 |
| | | | 709/222 |
| 2009/0282142 A1 | 11/2009 | Tamura et al. | |
| 2010/0191946 A1 | 7/2010 | Cheston et al. | |
| 2011/0246985 A1 | 10/2011 | Zhou et al. | |
| 2012/0023322 A1* | 1/2012 | Landry | G06F 8/65 |
| | | | 713/2 |
| 2014/0244989 A1* | 8/2014 | Hiltgen | G06F 9/4416 |
| | | | 713/2 |
| 2016/0070554 A1 | 3/2016 | Lewis et al. | |

OTHER PUBLICATIONS

"Dell Brocade Adapters Installation and Reference Manual: Brocade Uefi Support for Boot Over San" 4 pages, printed Apr. 25, 2016, <http://www.manualslib.com/manual/509816/Dell-Brocade-Adapters-html?page=157>.

"EMC Host Connectivity with Brocade Host Bus Adapters (HBAs) and Fibre Channel over Ethernet Converged Network Adapters (CNAs) in the Linux Environment", EMC Corporation, Published Mar. 2012, 70 pages, <http://uk.emc.com/collateral/TechnicalDocument/docu8349.pdf>.

List of IBM Patents or Patent Applications Treated as Related, Appendix P, Filed Herewith, 2 pages.

Chandrasekhar, et al., "Identification of Bootable Devices", U.S. Appl. No. 15/886,108, filed Feb. 1, 2018.

Chandrasekhar, et al., "Identification of Bootable Devices", U.S. Appl. No. 15/886,150, filed Feb. 1, 2018.

* cited by examiner ured to boot. Embodiments of the present invention recognize
IDENTIFICATION OF BOOTABLE DEVICES

BACKGROUND OF THE INVENTION

The present invention relates generally to the field of data processing systems, and more particularly to identifying and maintaining a listing of storage devices that includes an image of an operating system that can boot a computing system.

To operate, a computing system (e.g., a computing entity) utilizes at least a basic operating system in response to starting or restarting (e.g., initial program loading). Some computing systems include a basic operating system (BOS) or firmware in non-volatile storage, such as non-volatile random access memory (NVRAM), flash memory, and/or an electronically programmable read-only memory (EPROM). An example of firmware is a Basic Input/Output System (BIOS) utilized by a computing system to perform hardware initializations and establish communications with storage devices that may include an operating system. In some computing systems that provision and initiate other computing systems, a hypervisor may include a BOS. In system virtualization, each computing entity behaves as if it were a separate computer.

A hypervisor allocates (e.g., provisions) various physical and virtual resources of a larger computing system to the computing entities that are hosted by the larger computing system. A Type-1 hypervisor (e.g., a native hypervisor) may load via firmware; whereas, a Type-2 hypervisor (e.g., a hosted hypervisor) executes as a process of a higher-level operating system. A higher-level operating system and information associated with configuring a computing system can be included in a bootable image of an operating system. In some architectures, the storage entities, such as a CD-ROM or hard disk, which include the images of bootable operating systems, are components of a computing system. In other architectures, the storage entities that include a bootable image of an operating system are included within a storage system, such as a storage area network (SAN) that is connected to a computing system via a network. The selection of a boot device that includes a bootable image of an OS can be input manually by an administrator of a computing system/data processing center, or the selection of a boot device can be preconfigured in the firmware (e.g., BIOS) of the computing system.

SUMMARY

Aspects of an embodiment of the present invention disclose a method, computer program product, and computing system for managing an initiation of a computing system. In an embodiment, the method includes one or more computer processors detecting that a first computing system receives a request to initiate a second computing system. The method further includes one or more computer processors accessing a table that includes information associated with a plurality of storage entities that include bootable OS images, where the plurality of storage entities are included in at least one storage system. The method further includes one or more computer processors determining a first storage entity that includes a corresponding instance of a first bootable OS image of the requested second computing system. The method further includes one or more computer processors initiating the requested second computing system based, at least in part, on the instance of the bootable OS image of the first storage entity.

DETAILED DESCRIPTION

Figure 1:
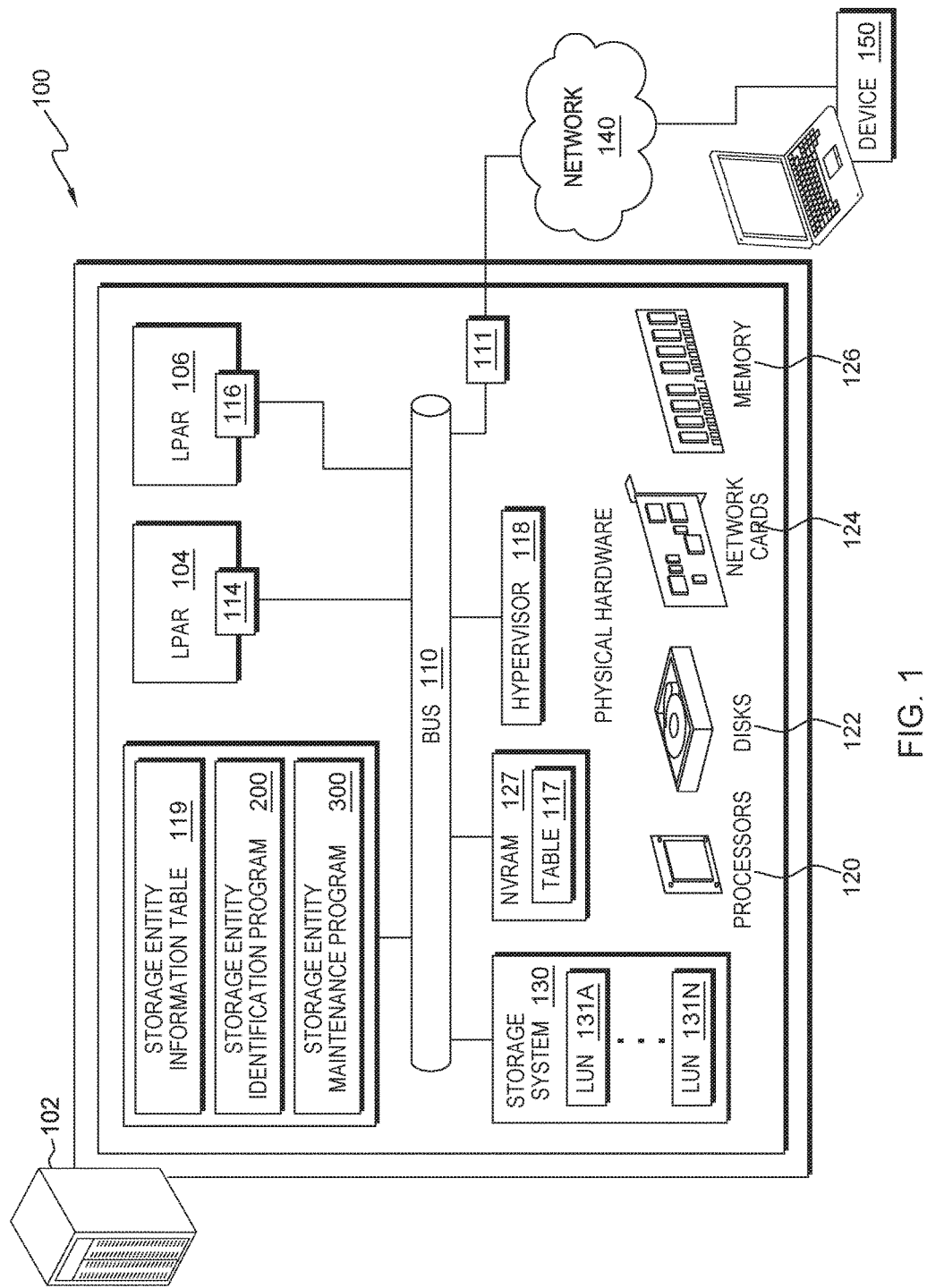
FIG. 1 illustrates a networked computing environment, in accordance with an embodiment of the present invention.

Embodiments of the present invention recognize that within a virtualized computing environment, a hypervisor provisions computing resources to various logical partitions to support the virtual machines (VMs), data communication dictates, and the software application utilized by users (e.g., customers). A virtualized computing environment may include: a computing system that includes a plurality of interconnected physical resources (e.g., microprocessors, memory, storage devices, communication devices, etc.); a local group/cluster of computing systems, such as racks of blade servers, network-attached storage systems, and storage area networks (SANs); distributed computing environments, such as a cloud infrastructure; or any combination thereof. In one architecture, a hypervisor (i.e., a Type 1 hypervisor) installs as the operating system of a computing system and directly communicates with the physical resources of a computing system and paravirtualizes the physical resources for provisioning to VMs. In another architecture, a hypervisor (i.e., a Type 2 hypervisor) loads on top of an already installed and executing operating system of a computing system. In addition, some computer architectures further define a storage entity, storage device, and/or storage location with respect to a logical unit or logical unit number (LUN). A computing system may access multiple SANs and each SAN may include hundreds of LUNs.

Embodiments of the present invention also recognize that during a boot sequence, restart, and/or initial program load (IPL) of a computing system that at least one storage entity is accessible to the computing system and includes an operating system (OS) or OS image that is configured to be bootable. Embodiments of the present invention recognize that, based on the configuration of a computing system, the configuration of communication adapters, and the type of hypervisor utilized by the computing system, limitations exist to access a storage entity that includes a bootable OS.

One such limitation may occur with respect to communication adapters. Some communication adapters include flash memory that can include definitions (e.g., locations) of one or more LUNs that include bootable OS images; however, this may constrain the usage of the communication adapter and/or the computing systems that are initiated. Some limitations affect the number of storage entities and the types of storage entities that can be accessed in response to a boot sequence. In an example, if none of the limited number of identified storage entities do not include an image of an OS that is bootable (e.g., the image is corrupted), a scan of a SAN initiates to identify other storage entities that include bootable OS images. The scan for bootable OS images is time consuming and may also dictate manual intervention by an administrator of a computing system to select an image that includes the correct OS and software configuration to boot the computing system.

Embodiments of the present invention utilize one or more tables that list storage entities that are configured to include bootable storage entities. Embodiments of the present invention may include additional information associated with the OS image of a storage entity, such as the type of OS, an access path (e.g., a boot path) to a storage entity, I/O bandwidth of a storage entity, storage capacity of the storage entity, etc. Some embodiments of the present invention may include more than one instance of a table that lists storage entities that are configured to include bootable storage entities. An administrator may have access to instances of a table in NVRAM and/or secondary storage (e.g., on a hard disk), whereas a user of a computing system may be limited to accessing an instance of a table stored within secondary storage. In one example, a user is restricted to an instance of a table that is included in secondary storage to prevent corruption of the table in NVRAM. In another example, a version of LUN masking is utilized on the contents of a table to restrict the storage entities with bootable OS images that are visible to a user for configuring a new computing system based on security constraints.

Embodiments of the present invention include a table of storage entities configured to include bootable OS images that are stored in NVRAM of a computing system. The NVRAM is accessible by the BIOS and/or firmware of the computing system during the boot sequence and thereby accessing the table of storage entities configured to include bootable OS images. In some embodiments of the present invention, a user and/or administrator of the computing system is presented the list of storage entities and selects a LUN to boot the computing system. In other embodiments of the present invention, a request to initiate and/or boot a computing system includes additional information that identifies one or more storage entities that include bootable OS images that may be accessed to boot the requested computing system without the intervention of a user and/or administrator of a computing system. Various embodiments of the present invention store, in NVRAM, one or more programs that utilize the table of storage entities that is included in NVRAM.

In addition, embodiments of the present invention validate the integrity of a bootable OS image of a storage entity prior to utilizing the bootable OS image. Further embodiments of the present invention include maintenance capabilities that can execute periodically and/or can execute on demand to validate the integrity of some or all of the bootable OS image of storage entities listed in a table of storage entities configured to include a bootable OS image. During a maintenance event, embodiments of the present invention can: remove LUNs that include corrupted OS images from one or more tables, clone/backup a "good" instance of a bootable OS image, and notify a user and/or administrator of a computing system that a LUN/bootable OS image is unavailable. Since some computing systems can be booted from OS images stored on LUNs of a SAN, embodiments of the present invention may store multiple instances of a bootable OS image on different SANs as an aspect of disaster recovery and/or to avoid network issues, such as delays or outages.

The present invention will now be described in detail with reference to the Figures. FIG. 1 is a functional block diagram illustrating a networked computing environment 100, which includes computing node 102 (i.e., a virtualized computing system), network 140, and device 150, in accordance with the present invention.

Device 150 may be: a laptop computer, a tablet computer, a netbook computer, a personal computer (PC), a desktop computer, a personal digital assistant (PDA), a smart phone, a communications terminal, a wearable device (e.g., digital eyeglasses, smart glasses, smart watches, etc.), or any programmable computer system known in the art. In certain embodiments, computing node 102 and device 150 represents a computer system utilizing clustered computers and components (e.g., database server computers, application server computers, etc.) that act as a single pool of seamless resources when accessed through network 140, as is common in data centers and with cloud-computing applications. In general, computing node 102 and device 150 are representative of any programmable electronic device or combination of programmable electronic devices capable of executing machine readable program instructions and communicating with users of computing node 102 and device 150, via network 140. Computing node 102 and device 150 may include components, as depicted and described in further detail with respect to FIG. 4, in accordance with embodiments of the present invention.

Computing node 102 includes: bus 110; communication devices 111, 114, and 116; table 117; hypervisor 118; storage entity information table 119; NVRAM 127; storage system 130; storage entity identification program 200; storage entity maintenance program 300; and physical hardware. The physical hardware of computing node 102 includes processors 120, disks 122, network cards 124, and memory 126. Memory 126 may include: volatile memory, such as random access memory RAM; non-volatile memory, such as NVRAM 127, flash memory, erasable programmable read-only memory (EPROM); or any combination thereof. Hypervisor 118 may be stored in non-volatile memory of computing node 102. Computing node 102 may also include various programs and data (not shown) that enable the operations of computing node 102, such as one or more communication programs, N_Port_ID virtualization software, various communication protocols, system control and monitoring functions, a database management system, etc.

In an embodiment, computing node 102 is divided into multiple partitions that include logical partitions (LPARs) 104 and 106. In an illustrated example for computing node 102, LPAR 104 and LPAR 106 each run an independent operating environment, such as an operating system (OS). In some embodiments, LPAR 104 and LPAR 106 each include one or more virtual machines (VMs). LPAR 104 and LPAR 106 may execute the same OS, different OSs, or different configurations of the same OS. In various embodiments, computing node 102 is a node of a clustered computer system, such as a cloud computer.

Communications to and from network 140 are routed through communication device 111, such as a host bus adapter (HBA) or a shared Ethernet adapter (SEA) to communication devices 114 and 116 of respective LPARs 104 and 106, and/or hypervisor 118, in accordance with an embodiment of the present invention. In one embodiment, communication device 111 utilizes bus 110 to route communications from network 140 to various aspects (e.g., components) of computing node 102. In some embodiments, communication device 111 is comprised of one or more physical network cards (e.g., communication adapters) of network cards 124 controlled by hypervisor 118. In another embodiment, communication device 111 is associated with an LPAR (not shown) executing an OS, such as a virtual input/output (I/O) server (VIOS). In various embodiments, virtual network adapters are allocated to LPARs 104 and 106.

Hypervisor 118 forms logical partitions 104 and 106 from the physical resources of computing node 102. The physical hardware of computing node 102 is comprised of: processors 120, disks 122, network cards 124, and/or memory 126, which are allocated (e.g., provisioned) to local partitions 104, 106, and one or more other computing entities (not shown). In various embodiments, hypervisor 118 performs standard operating system functions and manages communication between LPAR 104, LPAR 106, storage system 130, NVRAM 127, and various physical hardware of computing node 102 via bus 110.

In one embodiment, bus 110 is generated by a software program that allows one VM to communicate with another VM utilizing various network fabrics, such as Fibre Channel switch fabric. Bus 110 may be configured to create a virtual local area network (VLAN) within computing node 102. In some embodiments, computing node 102 may utilize other technologies, such as VMCI or virtual network interface cards (VNIC), to enhance the communications with communication devices (e.g., virtual adapters) 114 and 116 or to replace communication devices 114 and 116. In an embodiment, bus 110 may be embedded into virtualization software or may be included in a server's hardware as part of its firmware. In various embodiments, bus 110 may be a combination of physical and virtualized resources that communicate via fiber optic cables, Ethernet cables, wiring harnesses, printed wiring boards (e.g., backplanes), wireless connections, etc.

In some embodiments, in addition to creating and managing the logical partitions and associated VMs, hypervisor 118 manages communication between the logical partitions and other systems within computing system 102 via one or more virtual switches (not shown). In an embodiment, some virtual switches and internal network communications are represented by bus 110. To facilitate communication, each logical partition may include one or more virtual adaptors for communication between the VMs within a logical partition and VMs or other systems outside of the LPAR. Examples of virtual adapters include virtual Ethernet adapters, virtual Fibre Channel adapters, virtual small computer serial interface (SCSI) adapters, and virtual serial adapters. Some of the virtual adapters utilize bus 110 to facilitate communications. In an embodiment, bus 110 may be configured to create as a Virtual Local Area Network (VLAN) within computing system 102. In another embodiment, computing system 102 may utilize other technologies, such as Virtual Machine Communication Interface (VMCI) protocol or virtual network interface cards (VNIC), to enhance the communications among virtual adapters. Physical and virtual adapters within computing system 102 may utilize protocols that support communication via virtual port IDs (e.g., NPIV, WWPNs), that communicate with various portions of computing system 102 via an internal communication system, such as bus 110.

In one embodiment, storage system 130 is provisioned from one or more storage devices of disk 122 (i.e., physical hardware) by firmware, such as hypervisor 118. Storage system 130 may be provisioned to include other physical and/or virtualized hardware, such as one or more network cards 124 and memory 126. In various embodiments, storage system 130 includes a plurality of storage entities identified as logical unit numbers (LUNs), such as LUN 131A thru LUN 131N. A LUN can be defined to: a portion of a storage device (e.g., a hard disk), include an entire the storage, or span more than one storage device and a LUN appear as disks to a BIOS function or volume management utility (not shown) of computing node 102. In some embodiments, storage system 130 is a SAN based on a VLAN within computing node 102. In an alternative embodiment, storage system 130 is a SAN system external to computing node 102 that communicates with computing node 102 via network 140.

In some embodiments, computing node 102 communicates through network 140 to device 150, other computing nodes (not shown) of networked computing environment 100, another virtualized computing environments (e.g., a cloud computing environment), and other computers (not shown). Network 140 can be, for example, a local area network (LAN), a telecommunications network, a wireless local area network (WLAN), a wide area network (WAN), such as the Internet, a communication fabric/mesh, or any combination of the previous, and can include wired, wireless, or fiber optic connections. In general, network 140 can be any combination of connections and protocols, such as Fibre Channel Protocol (FCP) that will support communications between device 150, computing node 102, and an external instance (e.g. a SAN) of storage system 130, in accordance with embodiments of the present invention. In another embodiment, network 140 operates locally via wired, wireless, or optical connections and can be any combination of connections and protocols (e.g., NFC, laser, infrared, etc.).

In some embodiments, a physical computer, such as computing node 102 is identified by a media access control address (MAC address), which is a unique identifier assigned to network interfaces for communications on the physical network segment. In other embodiments, a physical computer, such as computing node 102 is identified by an Internet protocol address (IP address).

Table 117 is a table, stored in NVRAM 127, that identifies storage entities, such as one or more LUNs that are configured to include a bootable OS image. In an embodiment, table 117 includes a World Wide Name (WWN) and/or a boot path for each LUN. In some embodiments, table 117 also includes information and/or metadata that further identifies the bootable OS image, such as the included operating system, one or more configuration files, an LPAR definition, one or more VMs associated with the OS image, boot paths, and information of one or more virtual appliances.

Storage entity information table 119 is a table, stored in secondary memory, that identifies storage entities, such as one or more LUNs that are configured to include a bootable OS image. In some embodiments, storage entity information table 119 includes additional information associated with a plurality of storage entities configured to include bootable OS images that may not be included within table 117 based on one or more constraints, such as storage space of NVRAM 127 or the data structure of table 117. In an example, storage entity information table 119 may be a data structure that can be cross-referenced and/or queried by a database management program, whereas table 117 may be limited to a simple array or text-based file.

Storage entity identification program 200 monitors requests to boot and/or initiate a computing system and identifies a storage entity that includes a bootable OS image utilized to boot/initiate a computing system. In one embodiment, storage entity identification program 200 identifies a storage entity that is configured to include a bootable OS image based on entries in a table. Instances of the table that identifies (e.g., lists) storage entities that are configured to include a bootable OS image may be stored in: NVRAM, secondary storage, or a combination thereof. In some embodiments, storage entity identification program 200 identifies two or more storage entities that include bootable OS images associated with the requested computing system. In some scenarios, storage entity identification program 200 automatically selects and utilizes a bootable OS image to initiate the requested computing system. In other scenarios, storage entity identification program 200 presents a list of identified storage entities that include a bootable OS image for selection by a user.

In various embodiments, storage entity identification program 200 also validates the integrity of an identified (e.g., selected) bootable OS image prior to initiating the requested computing system. In other embodiments, storage entity identification program 200 may present a user a selection of storage entities that include bootable OS images in response to determining that a storage entity fails a test to validate the integrity of a bootable OS image.

In a further embodiment, an instance of storage entity identification program 200 is included in NVRAM 127 and loads to a portion of memory 126 for execution in response to computing node 102 booting, rebooting, or experiencing an IPL. In one scenario, storage entity identification program 200 executes in response to computing node 102 not accessing a bootable OS image, for example via a BIOS boot sequence, prior to loading hypervisor 118 (e.g., a Type 2 hypervisor). In another scenario, storage entity identification program 200 is included as a system function included in firmware of computing node 102, as opposed to an installed or purchased software.

Storage entity maintenance program 300 maintains one or more tables of storage entities that identify a plurality of storage entities configured to include a bootable OS image by periodically validating the integrity of the bootable OS images. In one embodiment, storage entity maintenance program 300 removes one or more entries corresponding to storage entities that fail a bootable OS image integrity validation test from one or more tables of storage entities that include bootable OS images. In various embodiments, storage entity maintenance program 300 validates the integrity of bootable OS images based on one or more factors, such as time, usage, maintenance activity, a command of a user, etc. In another embodiment, storage entity maintenance program 300 updates one or more tables that identify storage entities that include bootable OS images in response to determining that another bootable OS image is configured.

In some embodiments, storage entity maintenance program 300 restricts access to a storage entity table based on security and/or system considerations. For example, storage entity maintenance program 300 may permit a user to modify but not delete storage entity information table 119 that is stored within disks 122 of computing node 102. However, storage entity maintenance program 300 restricts access to table 117 in NVRAM 127 to an administrator of computing node 102.

In an embodiment, storage entity maintenance program 300 executes concurrently with storage entity identification program 200. In another embodiment, storage entity maintenance program 300 initiates and executes in response to a command and/or query of another computing entity. In one scenario, storage entity maintenance program 300 initiates based on a command from storage entity identification program 200. In another scenario, storage entity maintenance program 300 initiates based on a command from hypervisor 118. In an example, hypervisor 118 determines that a SAN of networked computing environment 100 is offline and executes a storage entity maintenance program 300 to update table 117 based on the storage entities that are accessible by computing node 102 via network 140, thereby modifying the sequence of storage entities accessed to boot a requested system. In an alternative embodiment, an instance of storage entity maintenance program 300 is included in NVRAM 127 and initiates in response to a boot, reboot, or IPL of computing node 102.

Figure 2:
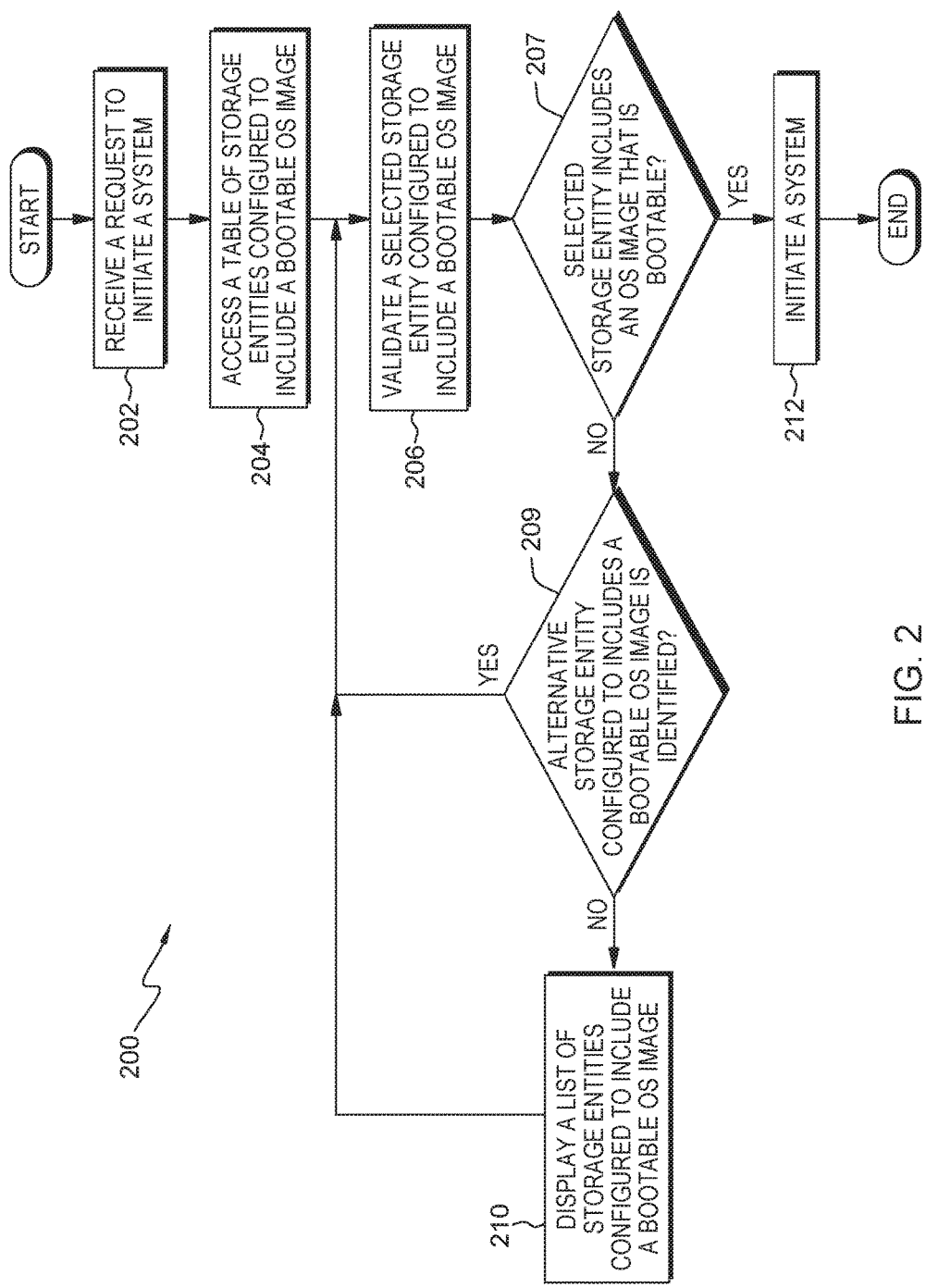
FIG. 2 depicts a flowchart of steps of a storage entity identification program, in accordance with an embodiment of the present invention.

FIG. 2 is a flowchart depicting operational steps for storage entity identification program 200 executing within computing node 102 of networked computing environment 100 of FIG. 1. Storage entity identification program 200 is a program that identifies a storage entity that is configured to include a bootable OS image in response to storage entity identification program 200 receiving a request to initiate a system, in accordance with embodiments of the present invention. In addition, storage entity identification program 200 validates the identified storage entity to ensure the integrity of the bootable OS. Alternatively, storage entity identification program 200 can present a user a selection of storage entities that include bootable OS images in response to storage entity identification program 200 failing to validate the integrity of a storage entity that includes a bootable OS.

In step 202, storage entity identification program 200 receives a request to initiate a system. In one embodiment, storage entity identification program 200 receives a request to initiate a system, such as LPAR 104 and one or more VMs (not shown) associated with LPAR 104 from hypervisor 118. In an example, if hypervisor 118 determines that computing node 102 is not provisioned to include a LPAR to host VM that utilizes AIX®, then storage entity identification program 200 receives the request to initiate an AIX® LPAR within computing node 102. In another embodiment, storage entity identification program 200 monitors (e.g., intercepts) a request transmitted by a user of device 150 and/or a computing entity for hypervisor 118 to initiate a system, such as initiating three instances of a virtual appliance within a blade server system (e.g., rack).

In various embodiments, storage entity identification program 200 receives a request to initiate a system that includes: provisioning information (e.g., an allocation of computing resources), a primary boot device (e.g., storage entity), one or more VM templates to load, and/or one or more virtual appliances load. In addition, storage entity identification program 200 may receive a request to initiate a system that also includes identification information (e.g., LUN values) of one or more alternate storage entities and information associated with the OS and corresponding configuration information to select and/or recreate a storage entity that includes a bootable OS image for the requested computing system. Alternatively, storage entity identification program 200 may receive a request to initiate a system that is a virtual appliance that is executed by hypervisor 118.

Still referring to step 202 in another embodiment, storage entity identification program 200 determines which computing resources of computing node 102 are available to be provisioned for a system. In an example, storage entity identification program 200 determines that a request to initiate a system is based on accessing the bootable OS of LUN 131B of storage system 130 and utilizing communication device 114 as the initiator. However, storage entity identification program 200 determines that communication device 114 is already provisioned for LPAR 104 and that as an initiator, communication device 116 does not map to the same physical storage device of storage system 130 in response to a request to access LUN 131B. In some embodiments, storage entity identification program 200 communicates with hypervisor 118 to identify information, such as boot paths that map LUN values between initiators (e.g., communication devices). The identified information associated with storage entities may be included in an associative array that may be accessed by storage entity identification program 200, or the identified information may be included in an instance of table 117 and/or storage entity information table 119.

In a further embodiment, storage entity identification program 200 determines that a request to initiate a system is workload based and that the request includes information dictating that two or more systems are initiated. If storage entity identification program 200 determines that two or more systems initiate concurrently, then storage entity identification program 200 may need to identify multiple LUNs, one for each system that is initiated. In an alternative embodiment, storage entity identification program 200 initiates in response to a boot, a reboot, or an IPL of computing node 102 and firmware of computing node 102 loads storage entity identification program 200 from NVRAM 127.

In step 204, storage entity identification program 200 accesses a table of storage entities configured to include a bootable OS image. In one embodiment, in response to an IPL (e.g., boot, reboot) of computing node 102 storage entity identification program 200 accesses a table that identifies storage entities that include a bootable OS. In an example, storage entity identification program 200 accesses table 117, stored in NVRAM 127 of computing node 102, to access a table (e.g., list) of LUNs that are identified as storing one or more bootable OS images. In response, storage entity identification program 200 determines at least one selection of a storage entity configured to include a bootable OS image to utilize to boot computing node 102. In some embodiments, storage entity identification program 200 communicates a list of identified storage entities and information associated with each storage entity to an administrator of computing node 102 for an indication of a selection of a storage entity utilized to boot computing node 102. In an example, storage entity identification program 200 identifies that LUN 131A and LUN 131B may be utilized to boot computing node 102. LUN 131A includes a bootable OS image for a Type-2 hypervisor that utilizes AIX®, and LUN 131B includes a bootable OS image for a Type-2 hypervisor that utilized LINUX®. Storage entity identification program 200 may pause to await a selection of either LUN 131A or LUN 131B input by the administrator of computing node 102.

In another embodiment, storage entity identification program 200 accesses a table of storage entities configured to include a bootable OS image (e.g., table 117) to identify whether one or more storage entities, such as primary boot LUN, a secondary boot LUN, and/or a backup boot LUN of a requested computing system are included in table 117. In some scenarios, storage entity identification program 200 automatically flags a primary boot LUN (e.g., storage entity) of the requested computing system for selection as a bootable OS image. In other scenarios, storage entity identification program 200 communicates a list of identified storage entities that include a bootable OS image and information associated with each storage entity of a requested computing system to a user and/or administrator of computing node 102. In response, storage entity identification program 200 receives at least one selection indicating a storage entity configured to include a bootable OS image to utilize to boot the requested computing system.

Still referring to step 204 in a further embodiment, storage entity identification program 200 accesses different table of storage entities configured to include a bootable OS image, such as storage entity information table 119. In an example, storage entity identification program 200 accesses an instance of storage entity information table 119 that identifies storage entities configured to include a bootable OS image that are located in tertiary storage, such as a tape library or an optical jukebox. In some scenarios, computing node 102 may dictate that a bootable OS image included in tertiary storage is copied to a storage entity of a secondary storage system prior to further execution of storage entity information program 200.

In an alternative embodiment, if storage entity identification program 200 determines that table 117 and storage entity information table 119 are empty, or are not included in computing node 102, then storage entity identification program 200 initiates a scan of at least one storage system included within and/or accessible by computing node 102 to identify a list of storage entities that are configured to include a bootable OS image. Storage entity identification program 200 may skip, referring to FIG. 2, to Step 210 to display the list of storage entities that include bootable OS images that were identified by the scan of at least one storage system.

In step 206, storage entity identification program 200 validates a selected storage entity configured to include a bootable OS image. In one embodiment, storage entity identification program 200 copies a bootable OS image from a storage location, such as storage system 130 or a SAN accessed via network 140 to computing node 102 to validate the integrity of the OS image. In another embodiment, storage entity identification program 200 validates the integrity of an OS image in-situ by analyzing the master boot record (MBR) of the OS image. In some embodiments, storage entity identification program 200 may validate each of the OS images of storage entities associated with a requested computing system, as opposed to validating a single, selected storage entity. In various embodiments, storage entity identification program 200 may update a table of storage entities that include bootable OS images, such as table 117 and/or storage entity information table 119 in response to storage entity identification program 200 determining that one or more OS images fails a validation test. Storage entity identification program 200 may update a table of storage entities that include bootable OS images by removing a storage entity that include an OS image that fails a validation test from the table or flagging (e.g., modifying a status) a storage entity within a table that include an OS image that fails a validation test.

In an alternative embodiment, storage entity identification program 200 cannot validate a bootable OS image based on the storage entity that includes the bootable OS image is not available (e.g., is off-line). In an example, storage entity identification program 200 identifies that LUN 131J is configured to include a bootable OS image of a requested computing system; however, LUN 131J is included in a SAN (not shown) that is accessed by computing node 102 via network 140. If network 140 and/or the SAN that includes LUN 131J is off line, then storage entity identification program 200 cannot validate the integrity or access the OS image of the requested computing system.

In decision step 207, storage entity identification program 200 determines whether a selected storage entity includes an OS image that is bootable. In one embodiment, storage entity identification program 200 determines that a selected OS image is not bootable based on the selected OS image failing an MBR integrity test (e.g., is "bad", is not acceptable). In another embodiment, storage entity identification program 200 determines that a selected OS image is not bootable based on a flag included within the data associated with each storage entity identified within a table, such as table 117 or storage entity information table 119. In an alternative embodiment, storage entity identification program 200 determines that a selected OS image is not bootable based on the selected OS image being included in an off-line storage entity. In various embodiments, storage entity identification program 200 determines that at least one selected storage entity includes an OS image that is bootable based on one or more selected OS images have passed a validation test (e.g., are acceptable).

Referring to decision step 207, responsive to determining that a selected storage entity does not include an OS image that is bootable (No branch, decision step 207), storage entity identification program 200 determines whether an alternative storage entity configured to include a bootable OS image is identified (decision step 209).

In decision step 209, storage entity identification program 200 determines whether an alternative storage entity configured to include a bootable OS image is identified. In one embodiment, storage entity identification program 200 compares the storage entities that are identified, by a request to initiate a system, to include a bootable OS image to one or more tables of storage entities that are configured to include bootable OS images, such as table 117. Storage entity identification program 200 determines whether an alternative storage entity that includes a bootable OS image is identified within the request to initiate a system. Storage entity identification program 200 may further analyze the information associated with one or more identified storage entities to determine whether an identified OS image is bootable. In an example, storage entity identification program 200 determines that at least one storage entity identified to boot a requested computing system passed a validation test in Step 206.

In an alternative embodiment, if storage entity identification program 200 determines that the request to initiate a system dictates manual intervention prior to storage entity identification program 200 utilizing an alternative storage entity, then storage entity identification program 200 does not automatically utilize an identified, alternative storage entity that includes a bootable OS image. Storage entity identification program 200 may delay further execution of decision step 209 until a system and/or administrator action, such as cloning a storage entity occurs. In an example, storage entity identification program 200 determines that a request to initiate a system includes a dictate that a backup OS image is created prior to instantiating a system to avoid data corruption during boot should an I/O conflict occur. In some embodiments, storage entity identification program 200 does not identify an alternative storage entity that is configured to include a bootable OS image. In an example, storage entity identification program 200 does not identify an alternative storage entity that is configured to include a bootable OS image if table 117 and storage entity information table 119 are empty.

Referring to decision step 209, responsive to determining that an alternative storage entity configured to include a bootable OS image is identified (Yes branch, decision step 209), storage entity identification program 200 loops to validate the bootable OS image of the alternative storage entity (step 206). In some embodiments, if storage entity identification program 200 previously validated the OS image of an alternative storage entity as "good," then storage entity identification program 200 may skip Step 206.

Still referring to decision step 209, responsive to determining that an alternative storage entity configured to include a bootable OS image is not identified (No branch, decision step 209), storage entity identification program 200 displays a list of storage entities configured to include a bootable OS image (step 210).

In step 210, storage entity identification program 200 displays a list of storage entities configured to include a bootable OS image. In one embodiment, storage entity identification program 200 displays a list of storage entities configured to include a bootable OS image that are associated with the requested computing system. In an example, storage entity identification program 200 displays, to a user of device 150, a list of alternative storage entities configured to include a bootable OS image so that the user may respond to storage entity identification program 200 with a selection of an alternative storage entity to use to boot the requested computing system.

In some embodiments, storage entity identification program 200 displays a list of storage entities configured to include a bootable OS image, to a user of device 150 and/or an administrator of computing node 102, that are similar to a storage entity of the requested computing system. Storage entity identification program 200 receives a response (e.g., selection) of a user of device 150 and/or an administrator of computing node 102 of at least one storage entity to use to boot the requested computing system.

In an alternative embodiment, storage entity identification program 200 displays a list of storage entities configured to include a bootable OS image generated by a scan of one or more storage systems. Storage entity identification program 200 receives a response (e.g., selection) of a user of device 150 and/or an administrator of computing node 102 identifying one or more storage entities of the scan of storage system to populate table 117 and/or storage entity information table 119.

Referring to decision step 207, responsive to determining that a selected storage entity includes an OS image that is bootable (Yes branch, decision step 207), storage entity identification program 200 initiates a system (step 212).

In step 212, storage entity identification program 200 initiates a system. In one embodiment, storage entity identification program 200 initiates a requested system (e.g., computing system, LPAR, blade server, etc.) by communicating the information associated with the storage device that includes the bootable OS image, such as LUN, one or more access paths and associated port addresses (e.g., initiator address, target address), etc. to hypervisor 118; and in response, hypervisor 118 completes the provisioning and initiates of the requested computing system. In one example, storage entity identification program 200 determines that LUN 131K includes a bootable OS image utilized to create a new LPAR (e.g., LPAR 116) within computing node 102. Storage entity identification program 200 communicates the access path of LUN 131K to hypervisor 118, and hypervisor 118 initiates LPAR 116. In another example, storage entity identification program 200 accesses a LUN that includes a virtual appliance that initiates (e.g., executes) within hypervisor 118.

In another embodiment, storage entity identification program 200 initiates a computing system by communicating the information associated with the storage device that includes the bootable OS image via bus 110 and/or network 140 to a computing system that is booting, rebooting, or initiating an IPL. In one scenario, in response to computing node 102 booting to include a Type-2 hypervisor, storage entity identification program 200 communicates with the firmware of computing node 102 (e.g., updates the boot sequence) with information associated with a storage entity that includes a bootable OS image configured to support the execution of the Type-2 hypervisor. In some embodiments, storage entity identification program 200 utilizes hypervisor 118, bus 110, and/or network 140 to access a blade server rack (not shown) and communicates the information associated with a storage device, such as LUN 131G that includes the bootable OS image configured to create a computing system based on the received request to initiate the computing system.

Figure 3:
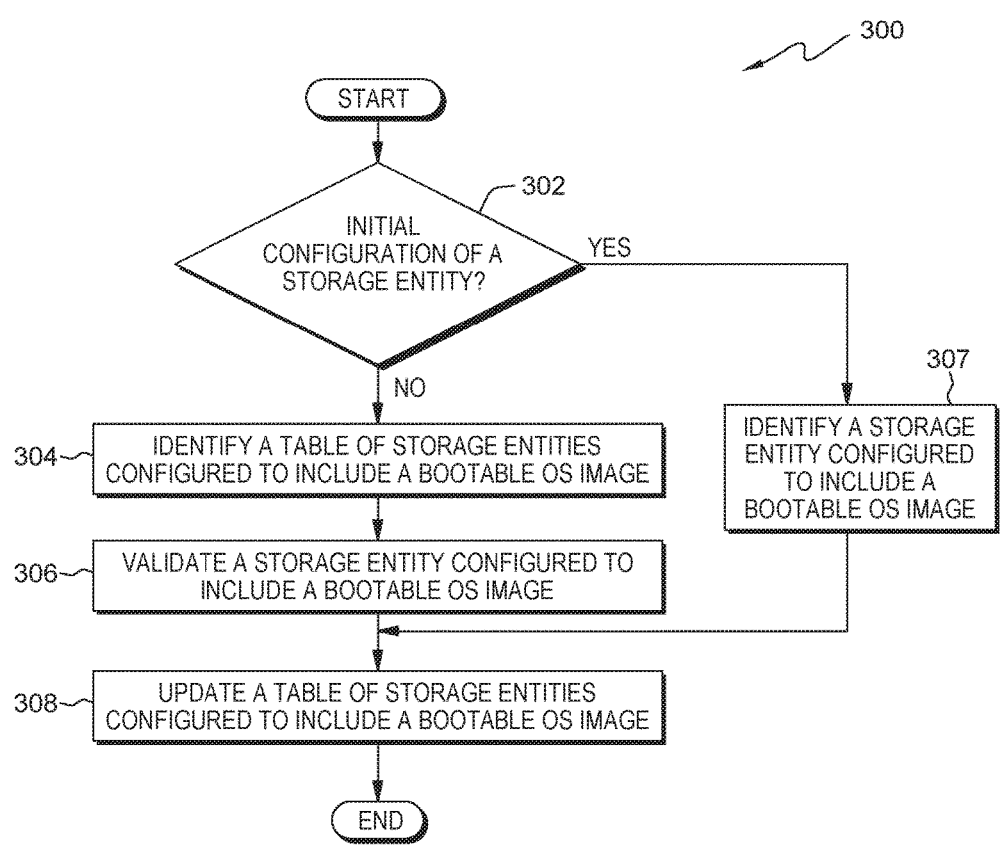
FIG. 3 depicts a flowchart of steps of a storage entity maintenance program, in accordance with an embodiment of the present invention.

FIG. 3 is a flowchart depicting operational steps for storage entity maintenance program 300, executing on computing node 102 of networked computing environment 100 of FIG. 1. Storage entity maintenance program 300 maintains one or more tables of storage entities that are configured to include bootable OS images by validating the integrity of the bootable OS images on a periodic basis, in accordance to embodiments of the present invention. Storage entity maintenance program 300 removes entries corresponding to storage entities that fail a bootable OS image integrity validation from one or more tables of storage entities that include bootable OS images. In some embodiments, storage entity maintenance program 300 updates one or more tables that identify storage entities that include bootable OS images in response to determining that another bootable OS image is configured. In other embodiments, storage entity maintenance program 300 can communicate changes to one or more tables of storage entities to a user and/or administrator of computing node 102.

In decision step 302, storage entity maintenance program 300 determines whether a configuration of a storage entity is an initial configuration of the storage entity. In one embodiment, storage entity maintenance program 300 determines that the configuration of a storage entity is not an initial configuration based on identifying that the identity of the storage entity is included in table 117 of NVRAM 127. In another embodiment, storage entity maintenance program 300 determines that the configuration of a storage entity is not an initial configuration based on identifying that the identity of the storage entity within storage entity information table 119 of computing node 102.

In an alternative embodiment, storage entity maintenance program 300 determines that the configuration of a storage entity is an initial configuration of the storage entity. In one scenario, storage entity maintenance program 300 determines that the configuration of a storage entity is an initial configuration of the storage entity, based on a user and/or system administrator configuring a new system, such as a LPAR, VM, blade server, etc. In another scenario, storage entity maintenance program 300 determines that the configuration of a storage entity is an initial configuration of the storage entity based on a user, a system administrator, another computing entity and/or aspect (e.g., function, program) of computing node 102 that creates a backup (e.g., cloning) of a bootable OS image of another storage entity, such as a LUN.

Responsive to determining that the configuration of a storage entity is not an initial configuration of the storage entity (No branch, decision step 302), storage entity maintenance program 300 identifies a table of storage entities configured to include a bootable OS image (Step 304).

In step 304, storage entity maintenance program 300 identifies a table of storage entities configured to include a bootable OS image. In one embodiment, storage entity maintenance program 300 scan NVRAM 127 and accesses table 117 to identify the listed storage entities that are configured to include a bootable OS image. In another embodiment, storage entity maintenance program 300 accesses storage entity information table 119 to identify the listed storage entities that are configured to include a bootable OS image. In various embodiments, storage entity maintenance program 300 may access storage entity information table 119 as opposed to table 117 in NVRAM 127 based on security constraints. In an example, storage entity maintenance program 300 accesses storage entity information table 119 based on a query by a user to review bootable OS images. Storage entity maintenance program 300 receives LUN masking constraints from a security program (not shown) and responds to the query with a list of LUNs and associated access path information that the user has authority to view and/or access.

In a further embodiment, storage entity maintenance program 300 receives a request to perform a periodic analysis (e.g., a maintenance schedule of validations) from computing node 102, and storage entity maintenance program 300 identifies one or more storage entities identified within storage entity information table 119 that are affected by the periodic analysis. A periodic basis may be time based, usage based, event based, or any combination thereof. In one example, storage entity maintenance program 300 receives a maintenance schedule on a weekly basis to validate 25% of the storage entities, based on a last validation date of a storage entity. Therefore, every four weeks storage entity maintenance program 300 identifies the majority of the storage entities of storage entity information table 119 for subsequent validation of storage entities configured to include bootable OS images. In another example, storage entity maintenance program 300 may identify storage entities for validation based on the number of accesses (e.g., usages) of the storage entity.

In other embodiments, storage entity maintenance program 300 receives a command by an administrator of computing node 102 to identify and to validate one or more of the storage entities configured to include bootable OS images listed in storage entity information table 119. In a different embodiment, storage entity maintenance program 300 compares the storage entities identified within table 117 and within storage entity information table 119 and reports the results of the comparison to a user and/or an administrator of computing node 102.

In step 306, storage entity maintenance program 300 validates a storage entity configured to include a bootable OS image. In one example, storage entity maintenance program 300 validates a bootable OS image by verifying a MBR of the bootable OS image. In some embodiments, storage entity maintenance program 300 accesses storage system 130 to validate one or more storage entities configured to include a bootable OS image. In other embodiments, storage entity maintenance program 300 accesses another storage system (not shown), such as a SAN via network 140 to validate one or more storage entities configured to include a bootable OS image. In some scenarios, storage entity maintenance program 300 copies a bootable OS image to computing node 102 for validation. In other scenarios, storage entity maintenance program 300 can validate a bootable OS image in-situ.

In various embodiments, storage entity maintenance program 300 flags various aspects of information associated with a storage entity based on the results of validating the storage entity. Information associated with a storage includes, but is not limited to, a date of use, a date of validation, a validation status (e.g., "good" or "bad", "pass" or "fail", "acceptable" or "not acceptable"), one or more alternative (e.g., backup, cloned) storage entities configured for booting, an access path to the storage entity, an I/O bandwidth of the storage entity, etc.

In one embodiment, storage entity maintenance program 300 validates the integrity of a bootable OS image of a storage entity based on commands (e.g., dictates) input by a user and/or administrator of computing node 102 to validate an identified storage entity (e.g., LUN). In another embodiment, storage entity maintenance program 300 validates the integrity of one or more storage entities based on a list of storage entities identified by a maintenance schedule.

Referring to decision step 302, responsive to a determination that the configuration of a storage entity is an initial configuration of the storage entity (Yes branch, decision step 302), storage entity maintenance program 300 identifies a storage entity configured to include a bootable OS image (Step 307).

In step 307, storage entity maintenance program 300 identifies a storage entity configured to include a bootable OS image. In one embodiment, storage entity maintenance program 300 identifies a storage entity that is configured to include a bootable OS image based on information of hypervisor 118 and/or one or more programs used to configure: an LPAR, a blade server, or a template of a VM.

In another embodiment, storage entity maintenance program 300 identifies a storage entity that is configured to include a bootable OS image based on identifying one or more commands and/or functions used to backup, duplicate, or clone an existing bootable OS image of another storage entity. In one example, storage entity maintenance program 300 determines that a user issues commands to clone LUN 131C. A system function of computing node 102 determines that LUN 131J is a storage entity of a similar capacity and I/O bandwidth as LUN 131C. Upon cloning and validating the integrity of the bootable OS image of LUN 131J, LUN 131J is identified to storage entity maintenance program 300 as equivalent to LUN 131C.

In an alternate embodiment, storage entity maintenance program 300 receives an indication from storage entity identification program 200 that the primary storage entity, LUN 131F, that includes a bootable OS image for a requested computing system, failed validation; however, the secondary storage entity, LUN 131G, passed an integrity test. Storage entity maintenance program 300 delays further actions until the computing system that utilizes LUN 131G is initiated. In response to storage entity maintenance program 300 determining that LUN 131G is not accessed, storage entity maintenance program 300 executes one or more system functions of computing node 102 to clone LUN 131G. In addition, storage entity maintenance program 300 flags LUN 131G as "good." In various embodiments, storage entity maintenance program 300 may determine based on one or more dictates, such as disaster recovery requirements of computing node 102 that a cloned storage entity is generated on a different storage system than the original storage entity.

In step 308, storage entity maintenance program 300 updates a table of storage entities configured to include a bootable OS image. In one embodiment, storage entity maintenance program 300 adds one or more entries to a table of storage entities (e.g., table 117, storage entity information table 119) based on identifying an initial configuration of a storage entity configured to include a bootable OS image. In another embodiment, storage entity maintenance program 300 updates one or more entries of storage entity information table 119 based on input of a user of device 150. In one example, a user utilizes device 150 to interface with storage entity maintenance program 300 to update an entry for LUN 131H within storage entity information table 119 to include two alternative storage entities, LUN 131C and LUN 131D.

In another example, an administrator of computing node 102 utilizes device 150 to interface with storage entity maintenance program 300 to remove one or more entries from table 117 and/or storage entity information table 119.

In various embodiments, storage entity maintenance program 300 communicates (e.g., reports) changes to a table of storage entities to a user and/or administrator of computing node 102. In one scenario, storage entity maintenance program 300 reports one or more updates/changes to storage entity information table 119 for verification by a user and/or administrator of computing node 102 prior to updating the information include in table 117.

Figure 4:
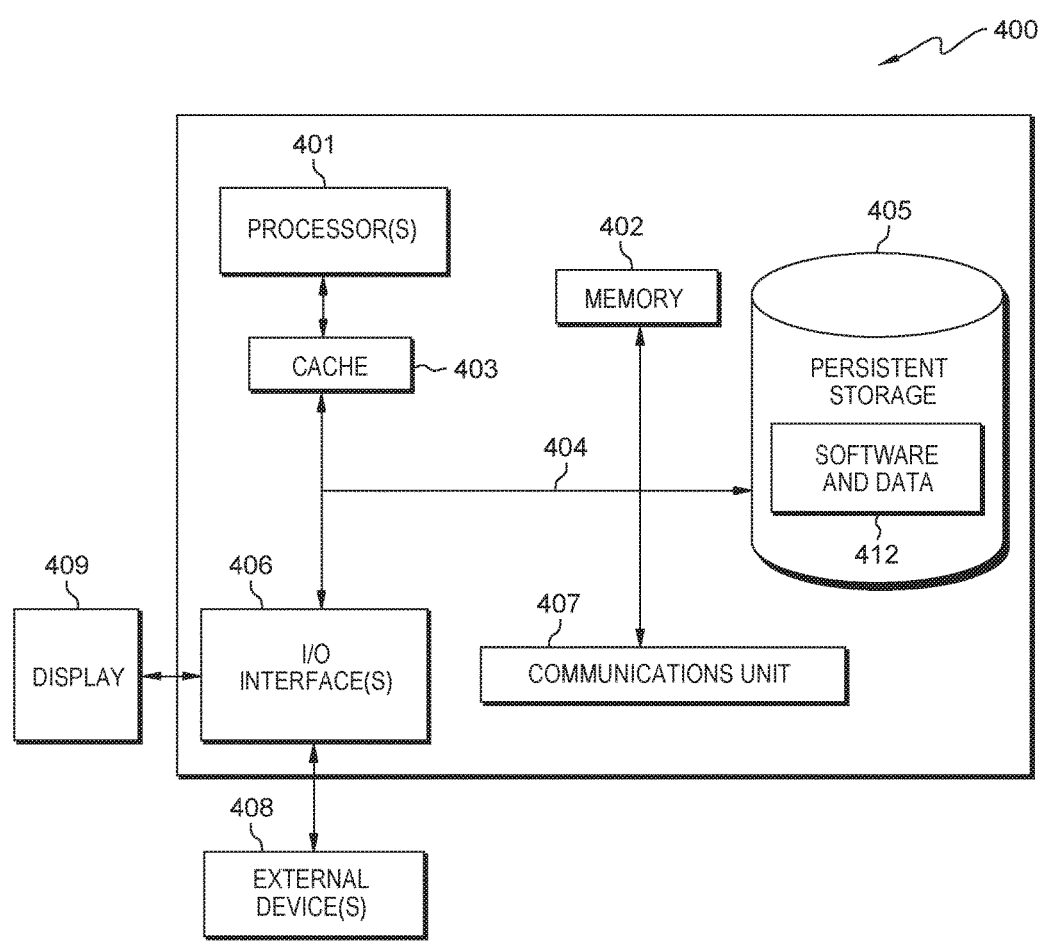
FIG. 4 depicts a block diagram of components of a computer, in accordance with an embodiment of the present invention.

FIG. 4 depicts computer system 400, which is representative of computing node 102 processors 120, and device 150. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402. With respect to computing node 102, memory 402 includes, at least in part, memory 126 (e.g., physical hardware) depicted in FIG. 1 to be allocated to one or more LPARs, and NVRAM 126.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information. With respect to computing node 102, persistent storage 405 includes, at least in part, disks 122 (e.g., physical hardware) depicted in FIG. 1 to be shared among LPARs. In addition, with respect to computing node 102 persistent storage 405 also includes storage LUN 131A thru LUN 131N of storage system 130.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to computing node 102, software and data 412 includes: table 117, hypervisor 118, storage entity information table 119, storage entity identification program 200, storage entity maintenance program 300, and other programs and data (not shown).

Communications unit 407, in these examples, provides for communications with other data processing systems or devices, including resources of computing node 102, bus 110 and device 150. In these examples, communications unit 407 includes one or more network interface cards. Communications unit 407 may provide communications through the use of either or both physical and wireless communications links. With respect to computing node 102, hypervisor 118, software and data 412, and program instructions and data, used to practice embodiments of the present invention may be downloaded to persistent storage 405 through communications unit 407. In addition with respect to computing node 102, communications unit 407 includes, at least in part, one or more network cards 124 (e.g., physical hardware), communication devices 111, 114, and 116 depicted in FIG. 1 to be shared among LPARs and/or interfacing with network 140.

I/O interface(s) 406 allows for input and output of data with other devices that may be connected to each computer system. For example, I/O interface 406 may provide a connection to external devices 408, such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display device 409.

Display device 409 provides a mechanism to display data to a user and may be, for example, a computer monitor. Display device 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is understood in advance that although this disclosure discusses system virtualization, implementation of the teachings recited herein are not limited to a virtualized computing environment. Rather, the embodiments of the present invention are capable of being implemented in conjunction with any type of clustered computing environment now known (e.g., cloud computing) or later developed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing an initiation of a computing system, the method comprising:
   detecting, by one or more computer processors, that a first computing system receives a request to initiate a second computing system;
   accessing, by one or more computer processors, a table that includes information associated with a plurality of storage entities that include bootable OS images, wherein the plurality of storage entities are included in at least one storage system;
   determining, by one or more computer processors, a first storage entity that includes a corresponding instance of a first bootable OS image of the requested second computing system;
   validating, by one or more computer processors, a bootable OS image of a determined storage entity, wherein validating the bootable OS image of the determined storage entity further comprises:
      accessing, by one or more computer processors, a storage system that includes the determined storage entity;
      determining, by one or more computer processors, a status indicating an integrity of the bootable OS image of the determined storage entity;
   responsive to determining that the integrity of the first bootable OS image is not acceptable, determining, by one or more computer processors, a second storage entity that includes an instance of the first bootable OS image;
   determining, by one or more computer processors, a status indicating the integrity of the instance of the first bootable OS image of the second storage entity;
   responsive to determining that the status of the integrity of the instance of the first bootable OS image of the second storage entity is acceptable, initiating, by one or more computer processors, the second computing system based, at least in part on the instance of the instance of the first bootable OS image of the second storage entity; and
   responsive to determining that the integrity of the instance of first bootable OS image of the first storage entity is not acceptable, updating, by one or more computer processors, the table that includes information associated with a plurality of storage entities, to remove an entry associated with the instance of first bootable OS image of the first storage entity that is not acceptable from the table that includes information associated with a plurality of storage entities.

2. The method of claim 1, wherein the table that includes information associated with the plurality of storage entities that include bootable OS images is stored in non-volatile random access memory (NVRAM), and wherein the NVRAM is included in the first computing system.

3. The method of claim 1, wherein the at least one storage system is a storage system included within the first computing system.

4. The method of claim 1, wherein the at least one storage system is a storage area network (SAN) that is network accessible by the first computing system.

5. The method of claim 1, wherein a storage entity is identified as a logical unit that includes a corresponding logical unit number (LUN) value, and wherein the LUN value further includes a World Wide Name (WWN).

6. The method of claim 1, further comprising:
   validating, by one or more computer processors, the bootable OS image of the determined storage entity, wherein validating the bootable OS image of the determined storage entity further comprises:
      accessing, by one or more computer processors, a storage system that includes the determined storage entity;
      determining, by one or more computer processors, a status indicating an integrity of the bootable OS image of the determined storage entity; and
   responsive to determining that the status indicating the integrity of the first bootable OS image of the first storage entity is acceptable, initiating via a hypervisor, by one or more computer processors, the second computing system based, at least in part on the first bootable OS image of the first storage entity.

7. A computer program product for managing an initiation of a computing system, the computer program product comprising:
   one or more computer readable storage media and program instructions stored on the one or more computer readable storage media, the program instructions readable/executable by one or more computer processors:

program instructions to detect that a first computing system receives a request to initiate a second computing system;

program instructions to access a table that includes information associated with a plurality of storage entities that include bootable OS images, wherein the plurality of storage entities are included in at least one storage system;

program instructions to determining a first storage entity that includes a corresponding instance of a first bootable OS image of the requested second computing system;

program instructions to validate a bootable OS image of a determined storage entity, wherein validating the bootable OS image of the determined storage entity further comprises:

program instructions to access a storage system that includes the determined storage entity;

program instructions to determine a status indicating an integrity of the bootable OS image of the determined storage entity;

program instructions to respond to determining that the integrity of the first bootable OS image is not acceptable by determining a second storage entity that include an instance of the first bootable OS image;

program instructions to determine a status indicating the integrity of the instance of the first bootable OS image of the second storage entity;

program instructions to respond to determining that the status of the integrity of the instance of the first bootable OS image of the second storage entity is acceptable by initiating the second computing system based, at least in part on the instance of the instance of the first bootable OS image of the second storage entity; and program instructions to respond to determining that the integrity of the instance of first bootable OS image of the first storage entity is not acceptable by updating the table that includes information associated with a plurality of storage entities, to remove an entry associated with the instance of first bootable OS image of the first storage entity that is not acceptable from the table that includes information associated with a plurality of storage entities.

8. The computer program product of claim 7, wherein the table that includes information associated with the plurality of storage entities that include bootable OS images is stored in non-volatile random access memory (NVRAM), and wherein the NVRAM is included in the first computing system.

9. The computer program product of claim 7, wherein the at least one storage system is a storage area network (SAN) that is network accessible by the first computing system.

10. The computer program product of claim 7, wherein a storage entity is identified as a logical unit that includes a corresponding logical unit number (LUN) value, and wherein the LUN value further includes a World Wide Name (WWN).

11. The computer program product of claim 7, further comprising:

program instructions to validate the bootable OS image of the determined storage entity, wherein validating the bootable OS image of the determined storage entity further comprises:

program instructions to access a storage system that includes the determined storage entity;

program instructions to determine a status indicating an integrity of the bootable OS image of the determined storage entity; and program instructions to respond to determining that the status indicating the integrity of the first bootable OS image of the first storage entity is acceptable by initiating, via a hypervisor, the second computing system based, at least in part on the first bootable OS image of the first storage entity.

12. A computer system for managing an initiation of a computing system, the computer system comprising:

one or more computer processors;

one or more computer readable storage media; and program instructions stored on the computer readable storage media for execution by at least one of the one or more processors, the program instructions comprising program instructions to detect that a first computing system receives a request to initiate a second computing system;

program instructions to access a table that includes information associated with a plurality of storage entities that include bootable OS images, wherein the plurality of storage entities are included in at least one storage system;

program instructions to determining a first storage entity that includes a corresponding instance of a first bootable OS image of the requested second computing system;

program instructions to validate a bootable OS image of a determined storage entity, wherein validating the bootable OS image of the determined storage entity further comprises:

program instructions to access a storage system that includes the determined storage entity;

program instructions to determine a status indicating an integrity of the bootable OS image of the determined storage entity;

program instructions to respond to determining that the integrity of the first bootable OS image is not acceptable by determining a second storage entity that include an instance of the first bootable OS image;

program instructions to determine a status indicating the integrity of the instance of the first bootable OS image of the second storage entity;

program instructions to respond to determining that the status of the integrity of the instance of the first bootable OS image of the second storage entity is acceptable by initiating the second computing system based, at least in part on the instance of the instance of the first bootable OS image of the second storage entity; and program instructions to respond to determining that the integrity of the instance of first bootable OS image of the first storage entity is not acceptable by updating the table that includes information associated with a plurality of storage entities, to remove an entry associated with the instance of first bootable OS image of the first storage entity that is not acceptable from the table that includes information associated with a plurality of storage entities.

13. The computer system of claim 12, wherein the table that includes information associated with the plurality of storage entities that include bootable OS images is stored in non-volatile random access memory (NVRAM), and wherein the NVRAM is included in the first computing system.

14. The computer system of claim 12, wherein the at least one storage system is a storage area network (SAN) that is network accessible by the first computing system.

15. The computer system of claim 12, wherein a storage entity is identified as a logical unit that includes a corresponding logical unit number (LUN) value, and wherein the LUN value further includes a World Wide Name (WWN).

16. The computer system of claim 12, further comprising:
  program instructions to validate the bootable OS image of the determined storage entity, wherein validating the bootable OS image of the determined storage entity further comprises:
    program instructions to access a storage system that includes the determined storage entity;
    program instructions to determine a status indicating an integrity of the bootable OS image of the determined storage entity; and
  program instructions to respond to determining that the status indicating the integrity of the first bootable OS image of the first storage entity is acceptable by initiating, via a hypervisor, the second computing system based, at least in part on the first bootable OS image of the first storage entity.

\* \* \* \* \*